(12) United States Patent
Bude et al.

(10) Patent No.: US 7,207,435 B2
(45) Date of Patent: Apr. 24, 2007

(54) CONVEYOR BELT DRIVE SPROCKET LOCKING ASSEMBLY

(75) Inventors: Craig A. Bude, Waukesha, WI (US); Michael A. Hosch, Oconomowoc, WI (US); Scott M. Hall, Sussex, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 11/214,550

(22) Filed: Aug. 30, 2005

(65) Prior Publication Data

US 2007/0045087 A1 Mar. 1, 2007

(51) Int. Cl.
*B65G 23/06* (2006.01)
(52) U.S. Cl. .................................. 198/834; 198/835
(58) Field of Classification Search ............ 198/832, 198/834, 835, 850–853
See application file for complete search history.

(56) References Cited

U.S. PATENT DOCUMENTS

| | | | |
|---|---|---|---|
| 3,213,703 A | | 10/1965 | Fitzgerald |
| 4,865,183 A | * | 9/1989 | Hodlewsky et al. ........ 198/834 |
| 5,449,063 A | * | 9/1995 | Thomas, Sr. ................ 198/834 |
| 5,518,109 A | * | 5/1996 | Dailey et al. ............... 198/834 |
| 5,566,817 A | | 10/1996 | Meeker |
| 5,934,447 A | * | 8/1999 | Kanaris ....................... 198/834 |
| 6,000,531 A | * | 12/1999 | Martin ........................ 198/835 |
| 6,719,127 B2 | * | 4/2004 | Depaso et al. .............. 198/834 |

FOREIGN PATENT DOCUMENTS

| | | |
|---|---|---|
| EP | 0 536 709 A1 | 4/1993 |
| JP | 6 286 837 | 10/1965 |

OTHER PUBLICATIONS

Serials 2600 Spiralox™ 3.2 Radius Belt, Product Line Extension.

* cited by examiner

*Primary Examiner*—James R. Bidwell
(74) *Attorney, Agent, or Firm*—Andrus, Sceales, Starke & Sawall, LLP

(57) ABSTRACT

A locking assembly for use with drive sprockets positioned to drive a conveyor belt supported by a conveyor frame assembly. The locking device includes a main body that extends through each of the drive sprockets positioned along a drive shaft of the conveyor assembly. The locking device includes spaced receiving notches that each receive one of the drive sprockets to maintain a desired spacing between the drive sprockets when the locking device is in its locking position. The locking device is movable to a release position to independently release each of the drive sprockets from the locking device. Once released, each of the drive sprockets are movable along the length of the drive shaft to facilitate cleaning of the conveyor assembly. When the locking device is in its locking position, the combination of the locking device and drive sprockets is movable along the longitudinal length of the drive shaft.

19 Claims, 6 Drawing Sheets

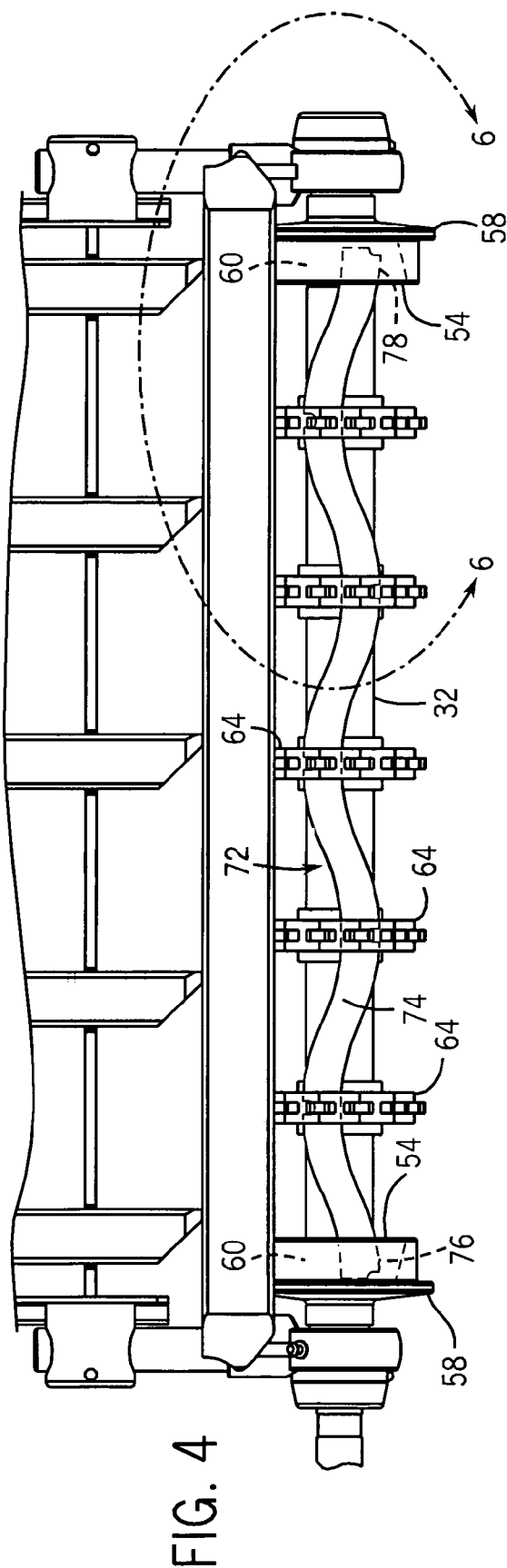
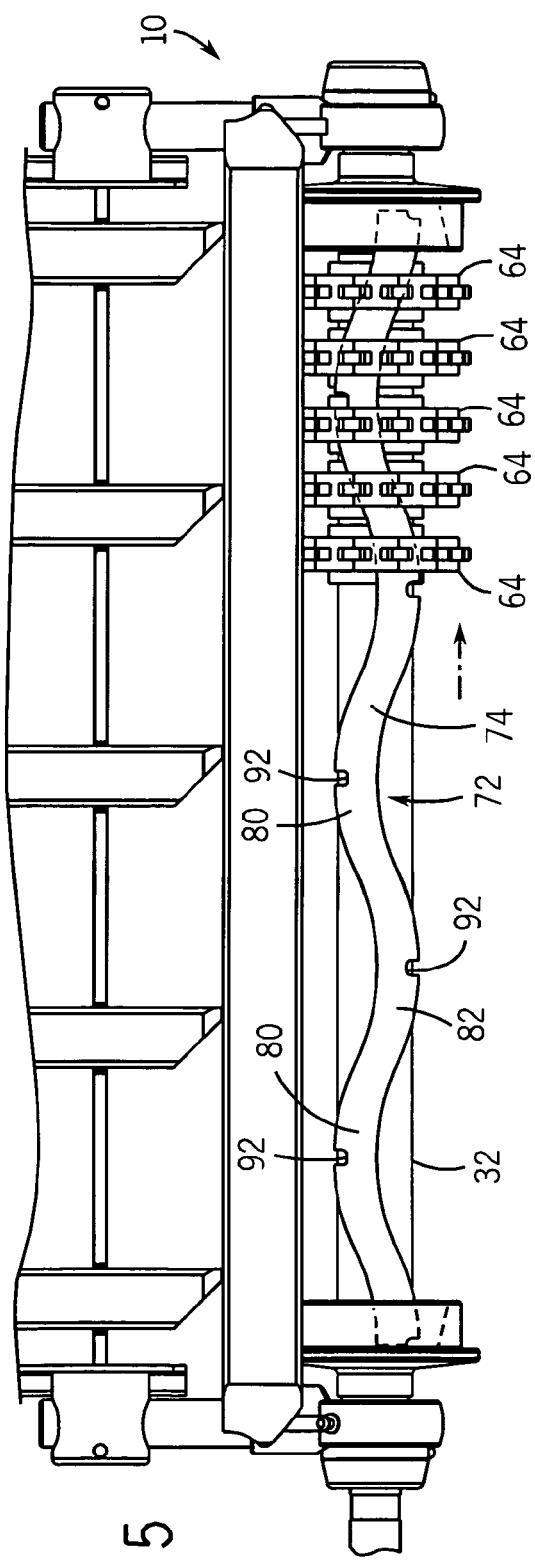
FIG. 4
FIG. 5

CONVEYOR BELT DRIVE SPROCKET LOCKING ASSEMBLY

BACKGROUND OF THE INVENTION

The present invention generally relates to a conveyor that is particularly useful in a sanitary environment. More specifically, the present invention relates to a locking assembly that can be used to maintain the desired spacing between drive sprockets used to drive a continuous conveyor belt.

Presently, in food processing conveyor applications, conveyors must be manufactured such that the conveyor belt can be removed and the entire conveyor frame assembly sanitized. Following sanitation, the conveyor belt must be reinstalled for continued operation. Numerous guidelines exist to regulate the type of conveyor assembly that be used in a sanitary environment, such as in a food processing facility. Typically, these guidelines require that the conveyor frame assembly must be capable of being disassembled and sanitized. Since the conveyor frame assembly must be sanitized on a regular basis, the conveyor assembly must be capable of being quickly disassembled to allow complete cleaning. Preferably, the disassembly should require no tools.

The food processing guidelines for conveyors also require that the conveyors not include any areas that collect water after the conveyor has been washed down. If the conveyor includes areas that collect water, bacteria can form in the wet areas, which is unacceptable in a sanitary environment. Therefore, the conveyors used in the food processing industry must be sealed and prevent water from pooling after the conveyor assembly has been washed down.

In many uses of sanitary conveyors, the conveyor belt is a plastic chain conveyor belt that is driven by a series of drive sprockets positioned near one end of the conveyor assembly. Each of the drive sprockets is positioned along a drive shaft, which is coupled to a drive motor. Since the conveyor assembly is used in a sanitary environment, the drive sprockets must be easily movable along the length of the drive shaft such that during cleaning, the areas of the drive shaft under the drive sprockets can be cleaned. Presently, each of the drive sprockets are freely movable along the longitudinal length of the drive shaft such that when the continuous conveyor belt is removed, the drive sprockets can be slid longitudinally and the portion of the drive shaft positioned beneath the drive sprocket can be easily cleaned.

Although such a configuration allows for easy cleaning of the drive shaft, the freely movable drive sprockets present alignment problems when the conveyor belt is replaced for normal usage after cleaning. Specifically, each of the drive sprockets must be separately aligned with the driving gaps in the plastic chain conveyor belt, which often proves to be tedious and time-consuming.

Therefore, it is desirable to provide a locking assembly that provides the desired spacing between the drive sprockets yet can be easily removed for cleaning. Further, it is desirable to provide a locking assembly that fixes the distance between the drive sprockets while allowing the plurality of drive sprockets to slide longitudinally along the drive shaft.

SUMMARY OF THE INVENTION

The present invention is a drive assembly for use with a conveyor assembly that includes a conveyor belt supported between a pair of spaced side frame members. The conveyor assembly extends from a first end to a second end and the drive assembly provides the required driving force to move the conveyor belt along the conveyor assembly.

The drive assembly includes a drive shaft that is positioned at a first end of the conveyor assembly. The drive shaft is rotatably supported by the pair of spaced side frame members. The drive shaft is coupled to a drive motor that provides the required force to rotate the drive shaft relative to the conveyor assembly. Preferably, the drive motor is supported along one of the side frame members of the conveyor assembly.

The drive shaft receives a series of drive sprockets that are spaced along the longitudinal length of the drive shaft. Since the conveyor assembly is designed for use in a sanitary environment, each of the drive sprockets are freely movable along the longitudinal length of the drive shaft to facilitate cleaning. Each drive sprocket includes a series of teeth positioned around its outer circumference that are configured to engage the conveyor belt. The spacing between the teeth on each of the drive sprockets is selected based upon the configuration of the conveyor belt. Preferably, the drive shaft has a square-shaped center section that engages a corresponding square-shaped central opening within the drive sprocket. The interaction between the drive shaft and the drive sprockets prevents the drive sprockets from rotating relative to the drive shaft during normal operation.

The drive assembly includes a locking device that extends between the series of spaced drive sprockets and maintains the desired spacing between the drive sprockets. The desired spacing between the drive sprockets is dictated by the spacing between the open slots formed on the conveyor belt. Thus, once the locking device engages the plurality of drive sprockets and is in its locking position, the desired spacing between the drive sprockets is maintained to aid in the alignment of the conveyor belt along the drive assembly.

The locking device includes a main body that extends between a first end and a second end. The main body has a generally serpentine shape that includes a series of alternating first curved sections and second curved sections, where the first and second curved sections each extend in an opposite direction from a center axis of the main body. Preferably, the main body is formed from a flexible material such that each of the curved sections can flex. Each of the curved sections includes an apex that includes a receiving notch. The receiving notch formed at the apex of each curved section is sized to receive and engage a portion of one of the drive sprockets.

When the locking device is installed between the series of drive sprockets, the locking device exerts a holding force on each of the drive sprockets. Specifically, the holding forces for adjacent drive sprockets are in an opposite direction from each other.

Each end of the main body of the locking device is received within an end cap mounted to the drive shaft. The interaction between the ends of the main body of the locking device and the end caps restricts the longitudinal movement of the locking device along the longitudinal length of the drive shaft. When the locking device engages each of the drive sprockets, the combination of the locking device and drive sprockets is movable along the longitudinal length of the drive shaft as a single unit.

The locking device is movable from the locking position to a release position. When the locking device is in the release position, the drive sprockets are released from the locking device and are freely movable along the length of the drive shaft to facilitate cleaning. Specifically, to release each drive sprocket, the curved portion of the main body of the locking device is deflected to release the receiving notch from the drive sprocket. Once the drive sprocket is released, the drive sprocket can be moved along the longitudinal length of the drive shaft. Thus, each individual drive sprocket can be independently released from the locking device, which further facilitates cleaning of the drive assembly.

The main body of the locking device and each of the drive sprockets are preferably formed from the same material used to form the conveyor belt. Thus, the expansion and contraction of the drive sprockets, locking device and conveyor belt occurs at approximately the same rate, which maintains the proper alignment between the drive sprockets and the conveyor belt during temperature changes.

BRIEF DESCRIPTION OF THE DRAWINGS

The drawings illustrate the best mode presently contemplated of carrying out the invention. In the drawings:

FIG. 4 is a top view illustrating the locking assembly fully engaged with the plurality of drive sprockets;

FIG. 5 is a top view illustrating the release of the locking assembly and subsequent movement of the drive sprockets prior to cleaning;

DETAILED DESCRIPTION OF THE PREFERRED EMBODIMENT

Figure 1:
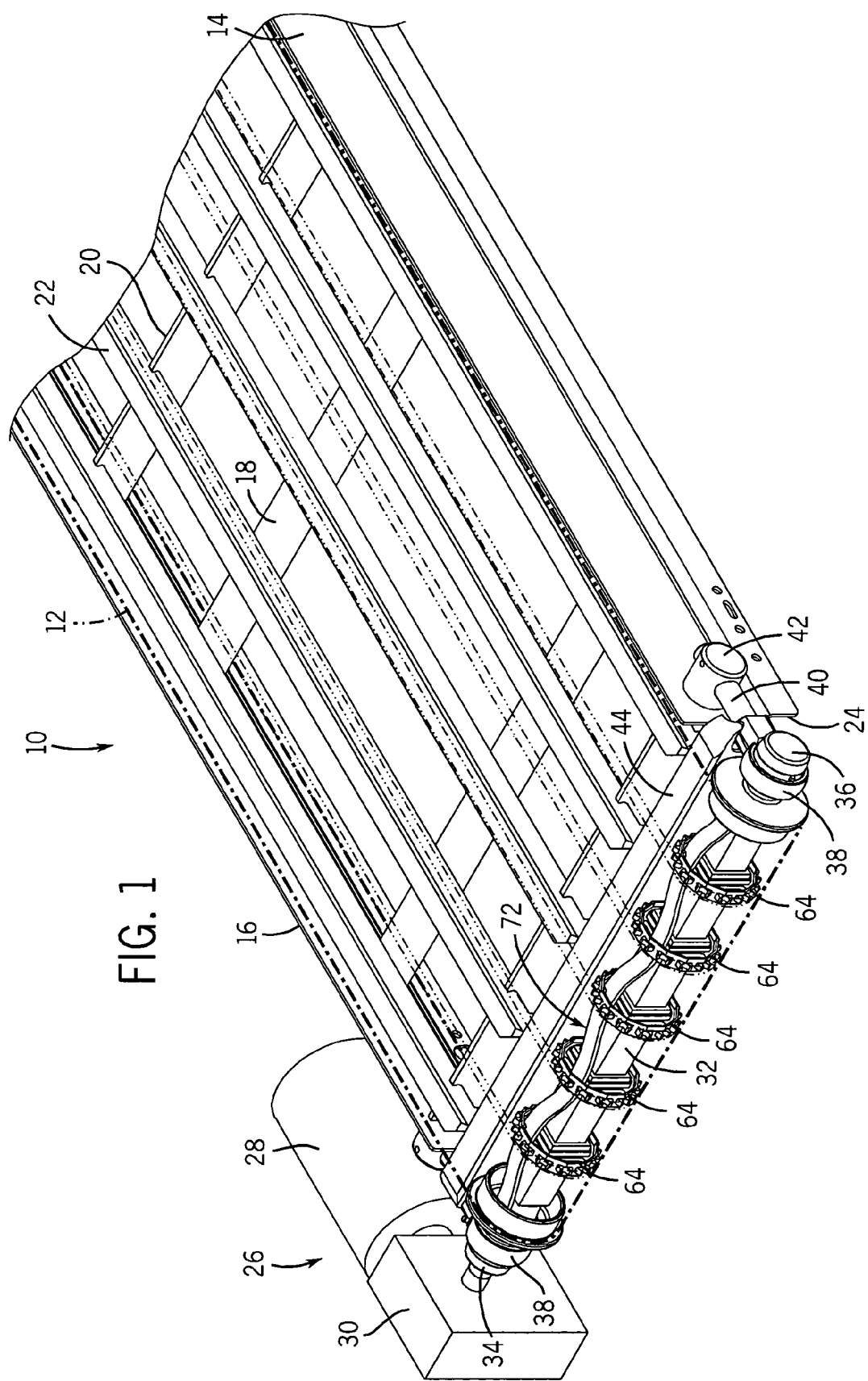
FIG. 1 is a perspective view of a conveyor assembly including the drive sprocket locking assembly of the present invention.

FIG. 1 illustrates a conveyor assembly 10 that includes a continuous conveyor belt 12 used to transport articles. The conveyor assembly 10 includes a pair of spaced side frame members 14, 16 spaced from each other by the width of the conveyor belt 12. The side frame members 14, 16 are joined by a series of cross-members 18 and rail supports 20. The rail supports 20 receive and support a series of spaced slide rails 22 that provide the support for the upper run of the conveyor belt 12.

As shown in FIG. 1, the pair of side frame members 14, 16 define a first end 24 for the conveyor assembly 12. The first end 24 is referred to as the drive end of the conveyor assembly 10 and includes a drive assembly 26. The drive assembly 26 provides the required motive force to move the continuous conveyor belt 12 relative to the stationary conveyor assembly 10.

The drive assembly 26 includes a drive motor 28 supported along the side frame member 16. The drive motor 28 is coupled to a gear box 30 that converts the rotation of the drive motor 28 to the required rotational movement to rotate a drive shaft 32 extending across the width of the conveyor assembly 10. The drive shaft 32 is rotatably supported across the width of the conveyor assembly 10 and provides the required rotation to move the conveyor belt 12.

As illustrated, the drive shaft 32 is rotatably supported at each of its ends 34, 36 by a bearing collar 38. The bearing collar 38 is connected to a support arm 40 that extends through and is supported by a cross-axle 42. In addition to supporting the bearing collars 38, the support arm 40 also supports a glide block 44. The spaced bearing collars 38 provide the required support for the drive shaft 32 and allow the drive shaft 32 to rotate freely.

Figure 2:
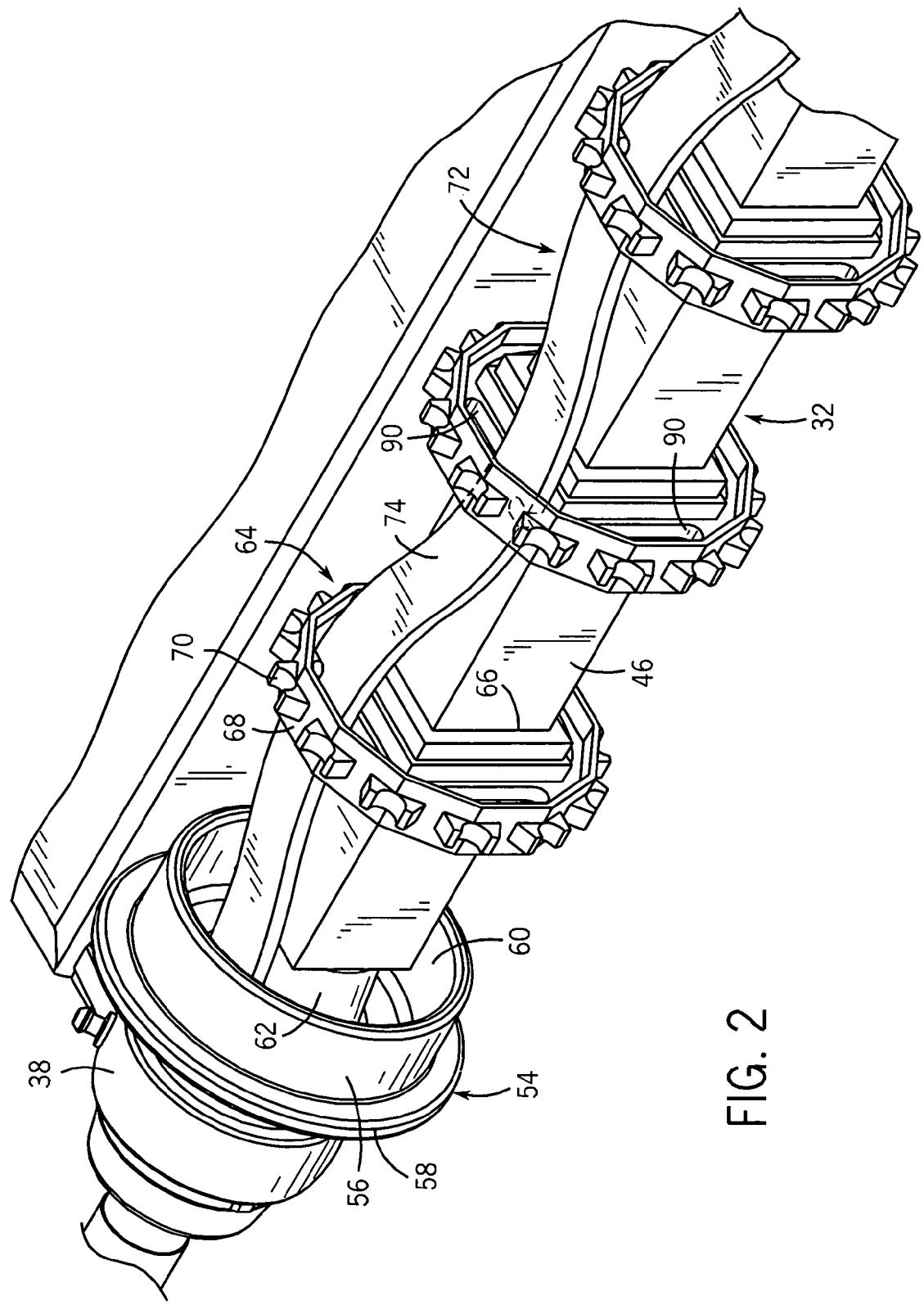
FIG. 2 is a magnified view illustrating the drive sprocket locking assembly positioned between several of the drive sprockets.
Figure 3:
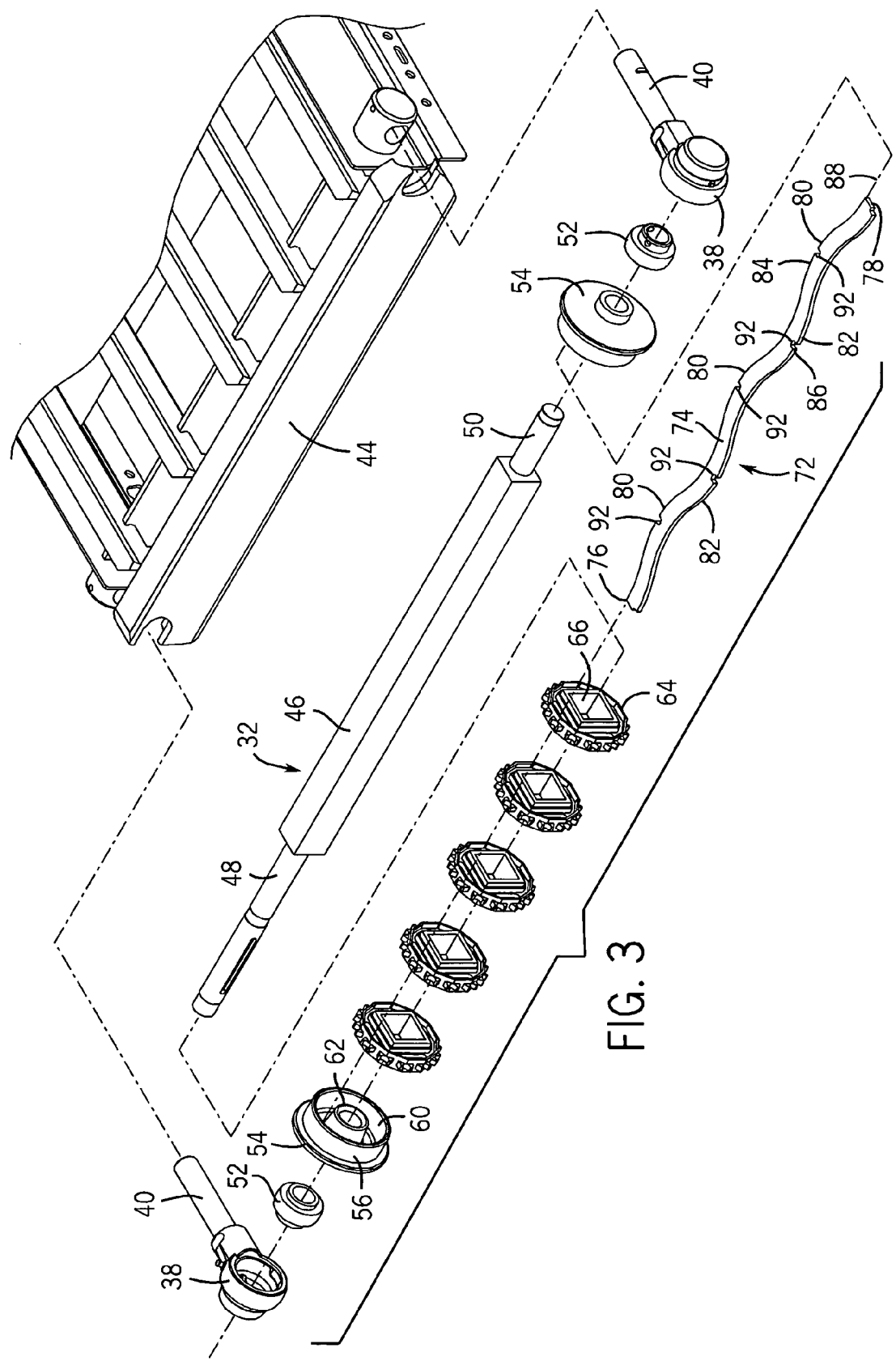
FIG. 3 is an exploded view of the drive sprocket locking assembly, the plurality of drive sprockets and the drive shaft.

As illustrated in FIG. 3, the drive shaft 32 has a generally square center section 46 positioned between the pair of rod shaped end sections 48, 50. The end section 48 extend through a bearing 52 and the bearing collar 38 and is engaged by the gear box. The opposite end section 50 extends through a similar bearing 52 positioned within the bearing collar 38. As best illustrated in FIGS. 1 and 3, each end of the drive shaft 32 includes an end cap 54. As illustrated in FIG. 2, each end cap 54 includes an outer belt support surface 56 and an extending guide ridge 58. The belt support surface 56 engages the conveyor belt, while the guide ridge 58 restricts the lateral movement of the conveyor belt during operation. The belt support surface 56 defines an internal cavity along with the mounting hub 62.

As best illustrated in FIGS. 1 and 3, the drive shaft 32 supports a series of drive sprockets 64 that are evenly spaced along the longitudinal length of the drive shaft 32. As illustrated in FIG. 3, each of the drive sprockets 64 includes a central opening 66 that allows the drive sprocket 64 to slide along the longitudinal length of the center section 46 of the drive shaft 32. As illustrated, the central opening 66 has a generally square shape that allows the drive sprocket 64 to slide along the longitudinal length of the center section 46 while preventing rotation of the drive sprocket 64 relative to the center section 46. The four sided interaction between the drive sprocket central opening 66 and the outer surface of the center section 46 allows each of the spaced drive sprockets 64 to rotate with the rotation of the drive shaft 32.

As shown in FIG. 2, each of the drive sprockets 64 includes an outer circumferential surface 68 that includes a series of spaced teeth 70. The teeth 70 are spaced along the outer circumference of the surface 68 and are sized to engage openings contained within the conveyor belt. In the preferred embodiment of the invention, the conveyor belt is a plastic chain link conveyor belt that includes drive slots formed between the links on the conveyor belt. An example of such a conveyor belt is Spiralox brand conveyor belt sold by Intralox, LLC.

Preferably, the conveyor belt is formed from UHMW plastic to provide the required durability and to permit sanitation of the conveyor belt. The spacing between the teeth 70 formed on each of the drive sprockets 64 is selected for the specific conveyor belt used with the conveyor assembly. Typically, the drive sprockets 64 are provided by the conveyor manufacturer so that the teeth spacing on the drive sprockets 64 corresponds to the drive slots formed on the particular conveyor belt. As can be understood in FIGS. 2 and 3, each of the drive sprockets 64 are freely movable along the longitudinal length of the center section 46 of the drive shaft 32. Specifically, no retaining mechanism is included on the drive shaft 32 to set the spacing between the drive sprockets 64.

As illustrated in FIGS. 1–3, a locking device 72 is positioned to engage each of the drive sprockets 64 and maintain the desired longitudinal spacing between the drive sprockets 64 along the longitudinal length of the drive shaft 32. The desired spacing between the drive sprockets 64 depends upon the specific conveyor belt configuration.

As shown in FIG. 3, the locking device 72 includes a main body 74 extending from a first end 76 to a second end 78. Preferably, the main body 74 has a length generally equal to the width of the conveyor belt. In the embodiment of the invention illustrated in FIG. 3, the main body 74 is formed from a flexible material, such as UHMW plastic. The main body 74 has a generally serpentine shape defined by a first series of curved sections 82 extending from the centerline 88 of the main body 74 in a first direction and a second series of curved sections 82 extending from the centerline 88 of the main body 74 in a second, opposite direction. The first series of curved sections 80 each includes an apex 84, while the second series of curved sections 82 likewise each include a similar apex 86. Each of the apexes 84, 86 generally extend away from a center line 88 of the main body 74 an equal distance in opposing directions.

Figure 10:
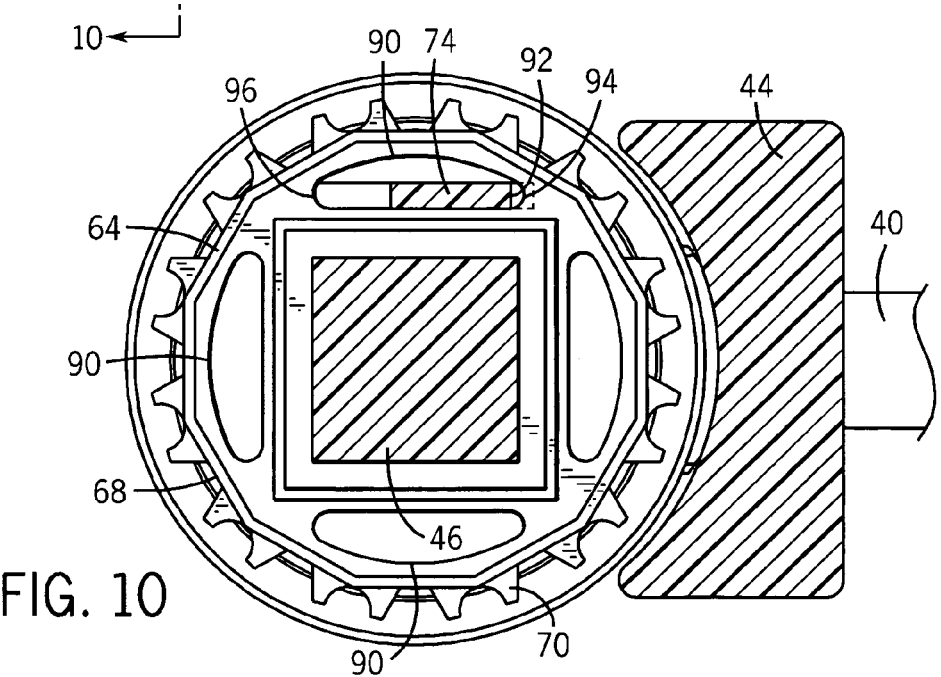
FIG. 10 is a section view taken along line 10—10 of FIG. 9.

As illustrated in FIGS. 2 and 10, the main body 74 extends through an open slot 90 formed in each of the drive sprockets 64. Each drive sprocket 64 includes four open slots 90 each generally aligned with one of the flat surfaces contained on the center section 46 of the drive shaft. The main body 74 has a thickness less than the height of the open slot such that the main body 74 is freely movable within each of the open slots 90. As illustrated in FIG. 4, the main body 74 extend through each of the drive sprockets 64 such that the first end 76 and the second end 78 are received within the internal cavity 60 defined by each of the end caps 54. As illustrated, the length of the main body 74 is slightly less than the distance between the guide ridges 58 such that the main body 74 can move along the longitudinal length of the drive shaft 32.

Figure 6:
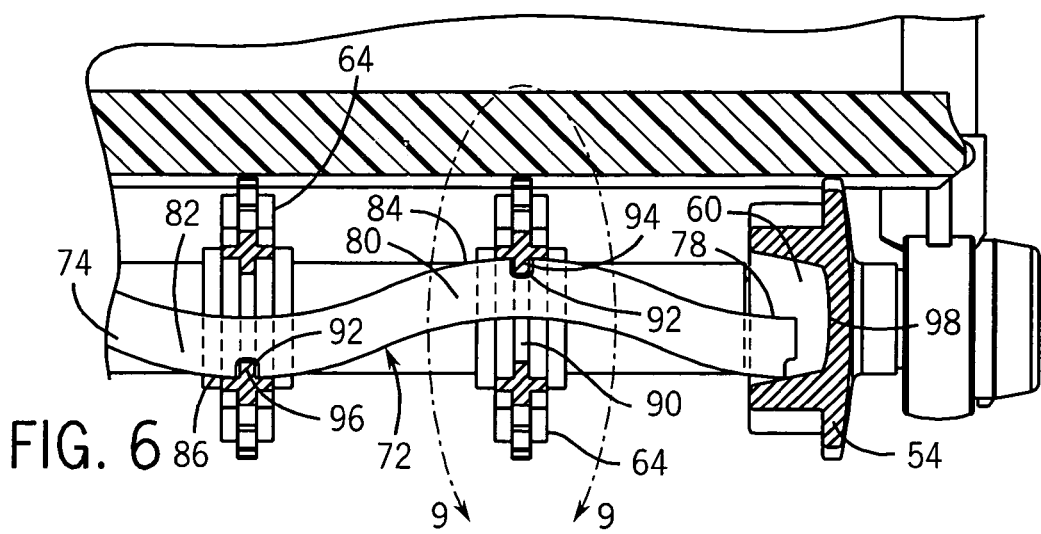
FIG. 6 is a magnified view taken along line 6—6 of FIG. 4 illustrating the locking assembly in its fully engaged position.

Referring now to FIG. 6, thereshown is the locking device 72 in its locking position. When the locking device 72 is in the locking position, a receiving notch 92 formed near the apex 84 of the first curved section 80 engages a shoulder 94 that defines a portion of the open slot 90 of the drive sprocket 64. At the same time, a corresponding receiving notch 92 formed at the apex 86 of the second curved section 82 engages an opposite shoulder 96 of the next drive sprocket 64. Since the first curved section 80 and the second curved section 82 extend in opposite directions from the centerline of the main body 74, the curved sections 80, 82 exert forces in opposite directions against the respective drive sprockets 64. The opposite retaining forces hold the respective drive sprockets 64 within the receiving notches 92.

When the main body 74 of the locking device 72 is in the locking position, each of the drive sprockets 64 is received in one of the receiving notches 92. Since the receiving notches 92 are formed in the main body 74 in predetermined positions, the engagement between the respective receiving notch 92 and one of the drive sprockets 64 maintains the desired spacing between the drive sprockets 64.

As illustrated in FIG. 4, the spacing between the drive sprockets 64 is maintained by the main body 74. However, since both the first end 76 and the second end 78 of the main body 74 are freely received in the internal cavities 60 defined by the pair of spaced end caps 54, the plurality of drive sprockets 64 and the main body 74 can move as a joined unit along the longitudinal length of the drive shaft 32. During the longitudinal movement of the joined unit, the spacing between the drive sprockets 64 remains constant. It is contemplated that the main body 74 of the locking device 72 can be created by the conveyor belt manufacturer and the position of the receiving notches 92 set based upon the distance between the drive slots contained on the conveyor belt. Thus, once the locking device 72 is moved into the locking position, the spacing between the drive sprockets 64 is set and corresponds to the type of conveyor belt being utilized.

As shown in FIG. 6, the second end 78 is contained within the internal cavity 60 of the end cap 54. The contact between the second end 78 and the back wall 98 restricts the amount of lateral movement of both the locking device 72 and the individual drive sprockets 64.

Figure 7:
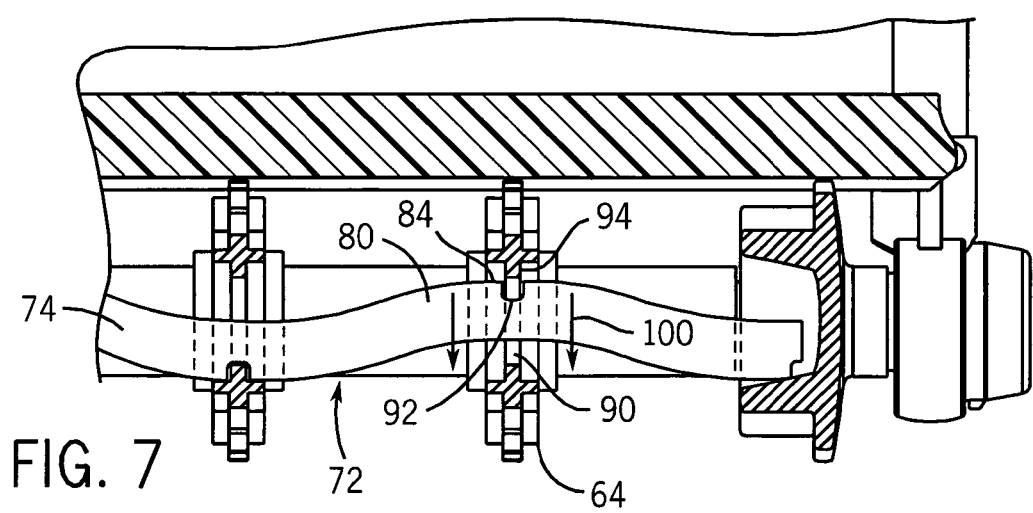
FIG. 7 is a top view similar to FIG. 6 showing the movement of the locking assembly to a disengaged position.

As discussed previously, the main body 74 of the locking device 72 is formed from a flexible material such that the locking device 72 can move from the locking position shown in FIG. 4 to a release position that allows the individual drive sprockets 64 to move freely along the longitudinal length of the drive shaft. Referring now to FIG. 7, the locking device 72 can be moved to the release position by applying a release force in the direction shown by arrow 100. Since the flexible main body 74 exerts a bias force in the direction opposite arrows 100, a force in the direction of arrow 100 causes the curved section 80 to flex and moves the receiving notch 92 out of engagement with the shoulder 94. Specifically, the curved section 80 is deflected a sufficient distance such that the apex 84 is positioned within the open slot 90 such that the drive sprocket 64 can be moved in a lateral direction, as shown by arrow 102 in FIG. 8.

Figure 8:
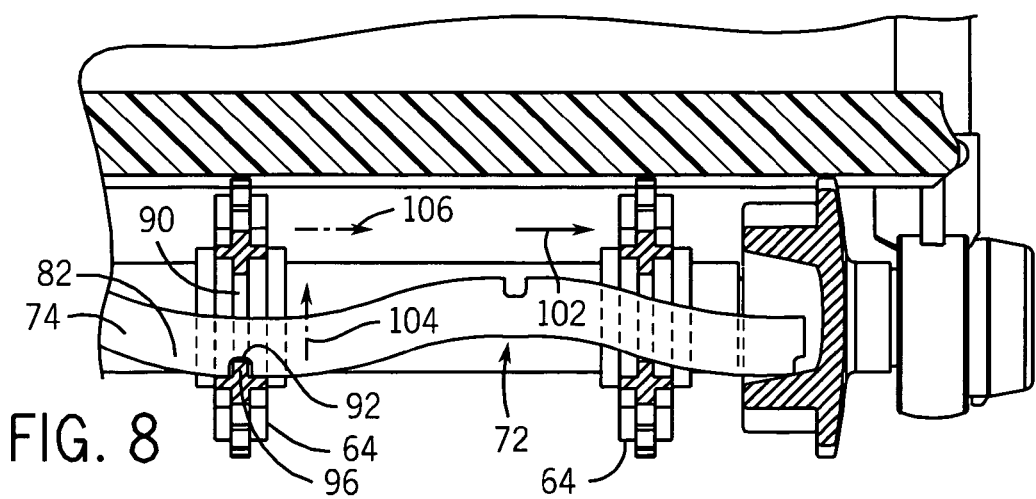
FIG. 8 is a top view similar to FIG. 7 illustrating the movement of the drive sprocket after the disengagement of the locking assembly.
Figure 9:
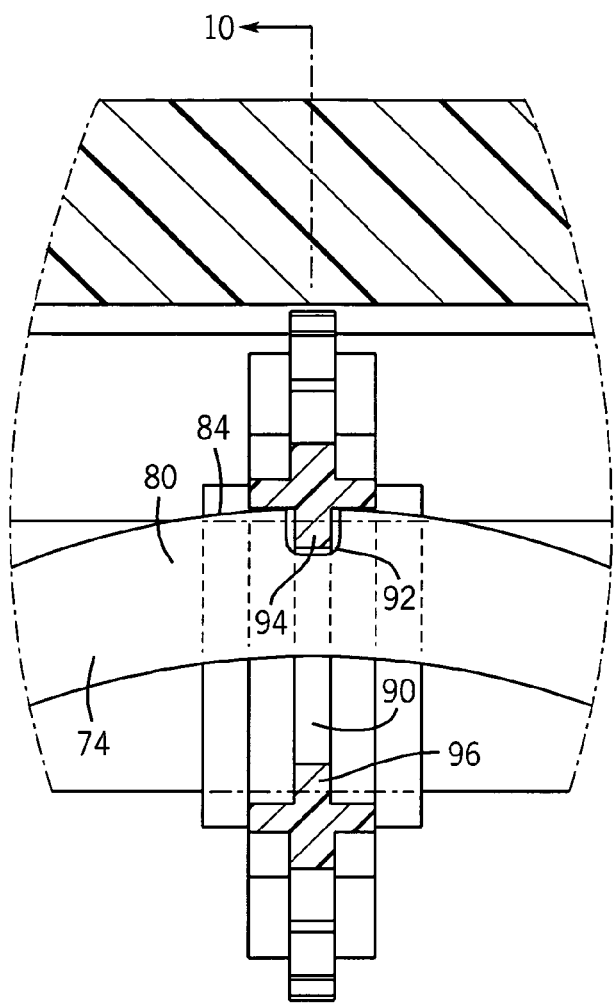
FIG. 9 is a magnified view taken along line 9—9 of FIG. 6 illustrating the engagement of the locking assembly with one of the drive sprockets.

Once the first drive sprocket 64 is moved in the direction shown by arrow 102, a release force can be applied to the second curved section 82 in the direction shown by arrow 104. Since the second curved section 82 is opposite the first curved section 80, the release force shown by arrow 104 in FIG. 8 is in the opposite direction from the release force shown by arrow 100 in FIG. 7.

Referring back to FIG. 8, the release force shown by arrow 104 is applied until the receiving notch 92 has cleared the shoulder 96 and the entire main body 74 is contained within the open slot 90. Once the main body 74 is contained within the open slot 90, the second drive sprocket 64 can be moved in the direction shown by arrow 106. In this manner, each of the drive sprockets 64 can be independently released from the locking device 72.

Once each of the drive sprockets 64 has been released from the locking device 72, the drive sprockets 64 can be moved to one end of the drive shaft 32, as best shown in FIG. 5. Once each of the drive sprockets 64 are moved to one side of the drive shaft 32, the surface area of the drive shaft normally beneath the drive sprockets 64 can be cleaned. Although FIG. 5 shows all five of the drive sprockets 64 moved to the right side of the drive shaft 32, it should be understood that the drive sprockets 64 could all be moved to the left side of the drive shaft 32 or that various numbers of the drive sprockets 64 could be moved to the right side of the drive shaft while the remainder of the drive sprockets 64 moved to the left side of the drive shaft. In any case, the drive sprockets 64 can be moved from their normal operating position such that the outer surface of the drive shaft 34 can be easily cleaned.

Once the drive shaft 32 and the remaining portions of the conveyor assembly 10 have been cleaned, the drive sprockets 64 can be slid along the drive shaft 32 into alignment with one of the receiving notches 92. Since the alternating curved sections 80, 82 are in opposite directions from each other, as the drive sprockets 64 are slid along the length of the main body 74, the receiving notches 72 snap into engagement with each of the drive sprockets 64. Thus, after cleaning, the drive sprockets 64 can be easily slid into the proper alignment for the conveyor belt as determined by the receiving notches 92.

Various alternatives and embodiments are contemplated as being within the scope of the following claims particularly pointing out and distinctly claiming the subject matter regarded as the invention.

What is claimed is:

1. A drive assembly for use with a conveyor assembly having a continuous conveyor belt movably supported by a conveyor frame having a pair of spaced side frame members, the drive assembly comprising:
   a drive shaft positioned at a first end of the conveyor frame, the drive shaft being rotatably supported by the pair of spaced side frame members;
   a drive motor operatively coupled to the drive shaft to rotate the drive shaft;
   a plurality of drive sprockets positioned along and rotatable with the drive shaft, each of the drive sprockets being freely movable along a longitudinal length of the drive shaft, each drive sprocket including a plurality of teeth sized to engage the conveyor belt and transfer the rotational movement of the drive shaft to the conveyor belt; and
   a locking device positioned to separately engage all of the plurality of drive sprockets to maintain a desired spacing between the drive sprockets.

2. The drive assembly of claim 1 wherein the locking device is movable between a locking position and a release position, wherein the spacing between the drive sprockets is fixed when the locking device is in the locking position and the drive sprockets are independently movable along the longitudinal length of the drive shaft when the locking device is in the release position.

3. The drive assembly of claim 2 wherein the locking device separately engages each of the drive sprockets such that the locking device is separately movable from the locking position to the release position relative to each of the drive sprockets.

4. The drive assembly of claim 1 wherein the plurality of drive sprockets and the locking device are movable along the longitudinal length of the drive shaft as an integral unit when the locking device is engaged with the drive sprockets.

5. The drive assembly of claim 4 wherein the drive shaft includes a pair of spaced end caps generally aligned with the spaced side frame members, wherein the locking device contacts the spaced end caps to limit the amount of movement of the locking device along the longitudinal length of the drive shaft.

6. The drive assembly of claim 2 wherein the locking device includes a main body extending through and separately engaging each of the plurality of drive sprockets.

7. The drive assembly of claim 6 wherein the main body includes a plurality of receiving notches that each receive one of the drive sprockets to retain the drive sprockets relative to the main body.

8. The drive assembly of claim 7 wherein the main body is formed from a flexible material and has a generally serpentine shape including a series of alternating curved sections each extending in an opposite direction relative to the adjacent curved section, wherein each curved section includes one of the receiving notches.

9. The drive assembly of claim 8 wherein the main body is formed from plastic.

10. A locking device for use with a plurality of drive sprockets positioned along a drive shaft rotatable to move a continuous conveyor belt supported between a conveyor frame having a pair of spaced side frame members, the locking device comprising:
    a main body having a length generally corresponding to the width of the conveyor frame;
    a plurality of receiving notches formed on the main body, the receiving notches each sized to receive and engage one of the drive sprockets,
    wherein when the drive sprockets are received within the receiving notches, the spacing between the drive sprockets along the drive shaft is fixed.

11. The locking device of claim 10 wherein the main body is formed from a flexible material and has a generally serpentine shape including a series of alternating curved sections each extending in an opposite direction from the adjacent curved section.

12. The locking device of claim 11 wherein each of the curved sections includes one of the receiving notches formed at an apex of the curved section, wherein the flexible main body exerts a holding force to retain the drive sprocket within the receiving notch.

13. The locking device of claim 12 wherein the curved sections are independently deflectable to separately disengage each drive sprocket from one of the receiving notches.

14. The locking device of claim 13 wherein the main body is formed from plastic.

15. A drive assembly for use with a conveyor assembly having a continuous conveyor belt movably supported by a conveyor frame having a pair of spaced side frame members, the drive assembly comprising:
    a drive shaft positioned at a first end of the conveyor frame, the drive shaft being rotatably supported by the pair of spaced side frame members;
    a drive motor operatively coupled to the drive shaft to rotate the drive shaft;
    a plurality of drive sprockets positioned along and rotatable with the drive shaft, each of the drive sprockets being freely movable along a longitudinal length of the drive shaft, each drive sprocket including a plurality of teeth sized to engage the conveyor belt and transfer the rotational movement of the drive shaft to the conveyor belt; and
    a locking device positioned to engage each of the drive sprockets to maintain a desired spacing between the drive sprockets, the locking device being movable between a locking position and a release position, wherein the spacing between the drive sprockets is fixed when the locking device is in the locking position and the drive sprockets are independently movable along the longitudinal length of the drive shaft when the locking device is in the release position, wherein when the locking device is in the locking position, the plurality of drive sprockets and the locking device are movable as in integral unit along the longitudinal length of the drive shaft.

16. The drive assembly of claim 15 wherein the drive shaft includes a pair of spaced end caps, wherein the locking device contacts the spaced end caps to limit the movement of the locking devices and the drive sprockets along the longitudinal length of the drive shaft.

17. The drive assembly of claim 15 wherein the locking device includes a main body extending through and engaging each of the plurality of drive sprockets, the main body including a plurality of receiving notches each sized to receive one of the drive sprockets to retain the drive sprocket relative to the main body.

18. The drive assembly of claim 17 wherein the main body is formed from a flexible material and has a generally serpentine shape including a series of alternating curved sections each extending in an opposite direction from the adjacent curved section, wherein each of the curved sections includes the receiving notch formed in an apex of the curved section such that the flexible main body exerts a holding force to retain the drive sprocket within the receiving notch.

19. The drive assembly of claim 18 wherein each of the curved sections are independently deflectable to disengage the drive sprocket from the engagement area.

* * * * *